Aug. 25, 1936.  H. W. PRICE ET AL  2,051,894
CLUTCH CONTROL MECHANISM
Filed Feb. 10, 1932  2 Sheets—Sheet 2
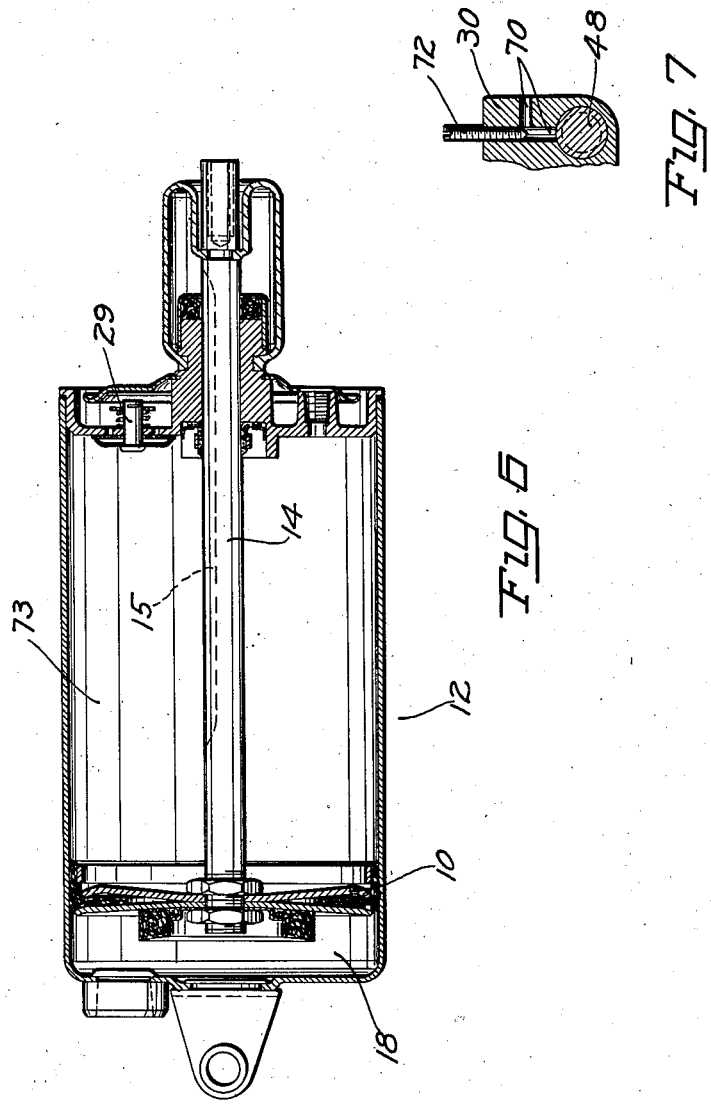
INVENTOR.
HAROLD W. PRICE
VICTOR W. KLIESRATH
BY H. O. Clayton
ATTORNEY Patented Aug. 25, 1936

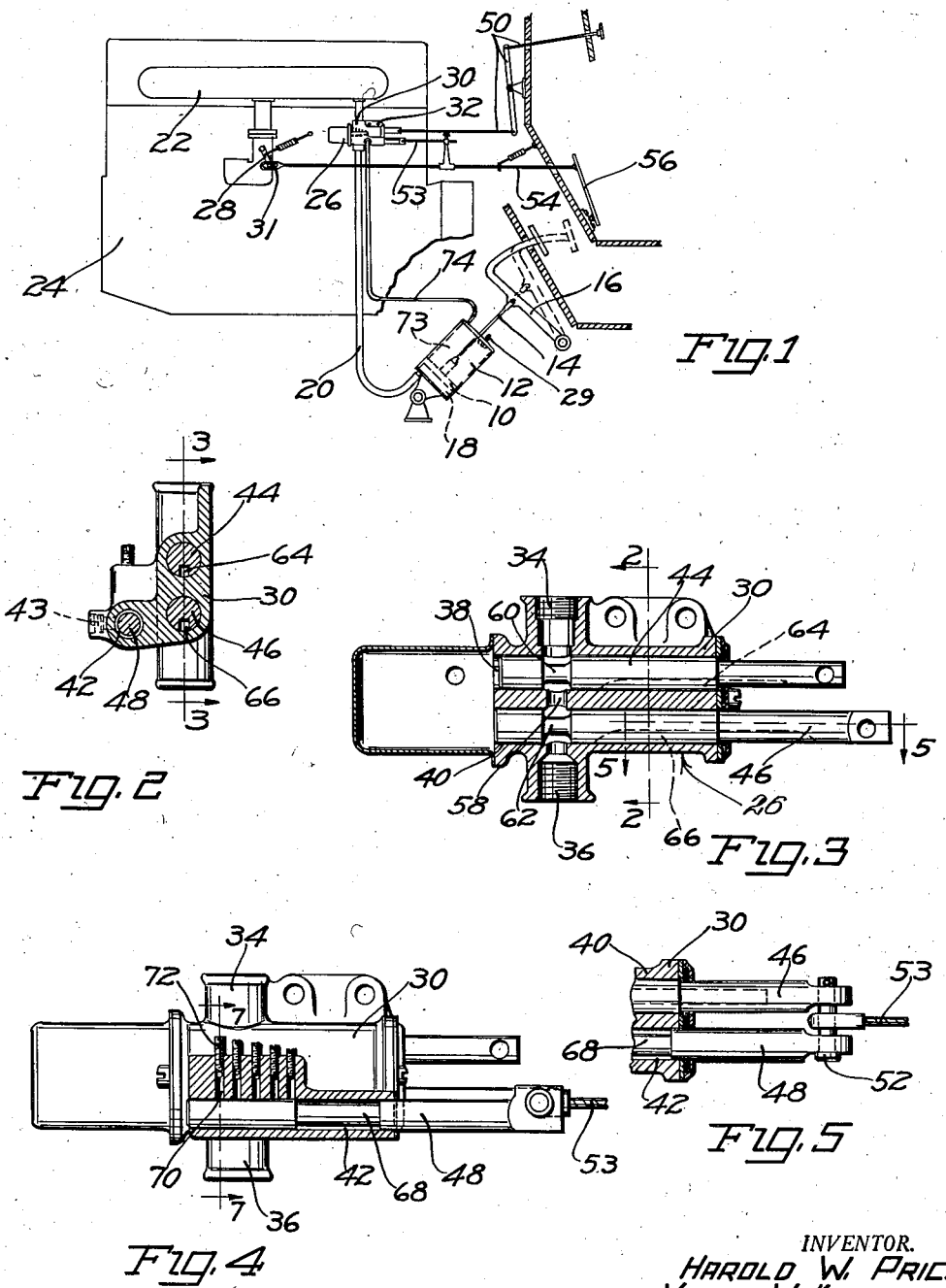

2,051,894

UNITED STATES PATENT OFFICE 2,051,894

CLUTCH CONTROL MECHANISM

Harold W. Price and Victor W. Kliesrath, South Bend, Ind., assignors to Bendix Aviation Corporation, South Bend, Ind., a corporation of Delaware Application February 10, 1932, Serial No. 592,169

5 Claims. (Cl. 192—.01)

This invention relates in general to vacuum operated power means for operating the clutch mechanism of an automotive vehicle and in particular to a valve structure for controlling the operation of the motor unit of the power means.

It is the principal object of the invention to improve upon the power operated clutch control mechanism disclosed in the patent to Ross I. Belcia, No. 1,470,272, dated October 9, 1923. This patent discloses an accelerator operated three-way control valve operable to either energize or deenergize a vacuum operated motor to effect, respectively, a disengagement or an engagement of the automotive clutch.

The present invention is, therefore, specifically directed to a valve structure which retains all of the attributes of the valve of the patented structure and in addition provides means for more effectively controlling the clutch engaging operation of the clutch motor.

To the above end there is suggested a valve unit comprising a one-piece casing member, preferably formed from a casting, serving as a housing for three reciprocable valve members slidable within said casing. Two of the reciprocable valve members, one serving as the three-way motor control valve member and the other as an adjustable bleed valve member, are operated by a common means, which common means is operated by the throttle controlling accelerator pedal of the vehicle. The remaining reciprocable valve member is preferably operated from the dash of the vehicle and serves as a cut-off member to render the power clutch control mechanism inoperative at the will of the operator.

It is, therefore, the important object of the invention to provide a compact valve unit which, incidentally, may be conveniently mounted on any suitable rigid portion of the chassis or power plant, said unit housing all of the valve controls for properly operating the clutch controlling fluid motor.

Other objects of the invention and desirable details of construction will become apparent from the following specification, taken in conjunction with the accompanying drawings, in which:

Figure 1 is a diagrammatic view of a vacuum operated clutch control mechanism embodying our invention;

Figure 2 is a sectional view, taken on line 2—2 of Figure 3, disclosing certain details of the control valve unit constituting the invention;

Figure 3 is another sectional view of the valve unit taken on line 3—3 of Figure 2;

Figure 4 discloses the valve unit in elevation, the bleed valve portion thereof being broken away to disclose the same in detail;

Figure 5 is a sectional view, taken on line 5—5 of Figure 3, disclosing the means providing for the joint operation of the bleed and three-way valves;

Figure 6 discloses, in longitudinal section, the clutch operating fluid motor, the operation of which is controlled by our novel valve mechanism; and Figure 7 discloses, in a sectional view taken on line 7—7 of Figure 4, details of the adjustable bleed valve structure.

There are disclosed, diagrammatically in Figure 1, the essential elements of an engine operated vacuum clutch control mechanism similar in general operation to that disclosed in the aforementioned patent. The piston 10 of a double-ended vacuum operated motor 12 is connected, by a rod 14, slotted at 15, with a conventional clutch pedal 16. The motor is adapted to be energized and deenergized to operate the clutch by alternately evacuating and venting the left compartment 18 thereof; to this end there is provided a flexible conduit 20 interconnecting the motor 12 with the intake manifold 22 of the internal combustion engine 24 of the vehicle, and there is interposed in said conduit a valve unit 26 constituting the present invention, and which unit serves to completely control the operation of the motor.

As is well-known to those skilled in this art, there exists in the manifold 22 a vacuum of some twenty inches of mercury when the engine throttle 28 is closed and the engine pistons are functioning as miniature pumps. A three-way motor control valve member of the valve unit 26 may be operated to place the clutch motor 12 in circuit with the manifold when the throttle is closed, thereby evacuating the left compartment of the clutch motor and disengaging the clutch, as disclosed in Figure 1. A check valve 29 in the clutch motor is automatically operated to admit the atmosphere to the motor to effect this power stroke of the motor. When it is desired to reengage the clutch the aforementioned three-way control valve is operated to vent the clutch motor, all as will be more completely brought out in the detailed description to follow.

Passing now to a more complete description of the structure and operation of the valve unit forming the subject matter of the present invention, the same preferably comprises an angular-shaped one-piece casing member 30, Figure 2, preferably formed from a casting. The valve casing is adapted to be rigidly secured to the engine casing, or equivalent rigid portion of the vehicle, by fastenings 32. The casing 30 is preferably provided with ports 34 and 36 adapted to receive the disconnected portions of the conduit 20, and is further provided with parallel bores 38, 40 and 42 adapted to receive reciprocable cut-out, three-way and bleed valve plunger members 44, 46 and 48, respectively. The cut-out and three-way members 44 and 46 are mounted one above the other and are preferably operated respectively, by linkage 50 operable from the dash, and by links 52 and 53 secured to a throttle controlling link 54 operable by an accelerator pedal 56. The third or bleed valve plunger member 48 is jointly operable with the three-way plunger 46 by means of the links 52 and 53, Figure 5, the two plungers being tied together by the cross link 52.

The juxtaposed bores 38 and 40 are preferably interconnected with the ports 34 and 36 and with each other by an opening 58, Figure 3, constituting, in effect, a cross bore. Pistons 44 and 46 are each provided with reduced portions 60 and 62 and with slots 64 and 66, respectively, the purpose of which will be described in detail hereinafter. The plunger member 48 is also provided with a reduced portion 68, and the casing 30 is provided with a plurality of angular-shaped ducts 70, each receiving the tapered ends of individually adjustable set screw members 72. The bore 42 is connected via a port 43 with the right compartment 73 of the clutch motor 12 by a flexible conduit 74.

Describing now the operation of the clutch controlling mechanism, release of the accelerator pedal 56 serves both to close the engine throttle and to move the valve plunger members 46 and 48 to the right to the positions disclosed in Figures 3 and 4. In this position of the parts, and with the cut-out member 44 in the cut-in position as disclosed in Figure 3, the reduced portion 62 of valve member 46 serves to intercommunicate the manifold with the clutch motor to evacuate the left compartment of the motor and disengage the clutch as disclosed in Figure 1. When it is desired to reengage the clutch the accelerator pedal is depressed, moving valve members 46 and 48 to the left cutting off the connection with the manifold and admitting air to the left compartment of the motor via the slot 66 in the valve member 46, the valve port 36 and the conduit 20. Preferably the valve unit is operated before the throttle is opened, this operation being insured by a lost motion connection at 31.

The clutch is thus permitted to engage under the action of its spring, the rate of engagement being now controlled by means of the rate of efflux of air from the right compartment 73 of the motor, which rate is determined by the adjustment of the set screw members 72 in the bleed valve structure and by the shape of the slot 15 in the rod 14 of the motor. The driving clutch plate moves rather rapidly during the first part of its stroke due to the relatively rapid efflux of air from the slot 15, and thereafter the clutch plate movement, just prior to the contacting of the plates, is relatively slow due to the throttled egress of air via the ducts 70 in the bleed valve. The mode of movement of the driving clutch plate is thus fixed for a given setting of the throttle and bleed valve, determined by the position of the accelerator pedal, and this movement may be varied by the adjustment of the set screw members 72. With a slight opening of the throttle, for example, with the car in low or reverse gears, there is a corresponding relatively slow engagement of the clutch due to the relatively few ducts 70 registered with the reduced portion 68 of the bleed valve. This permits a relatively slow slipping clutch engagement in low and reverse gears, which is the end desired. With the transmission in either intermediate or high gears the throttle is usually opened to a greater extent and the clutch is engaged more rapidly due to the increased rate of air bleed from the motor; furthermore, if the throttle is opened rather wide, either voluntarily or involuntarily, the clutch is engaged before the motor can be stepped up to a racing speed. If a high racing speed is reached before the clutch plates engage, a rapid wearing of the friction surfaces ensues, which effect is, of course, highly undesirable.

When it is desired to dispense with the power mechanism for operating the clutch, the operator merely has to pull out on the dash control to thereby move the plunger 44 to the left, placing the cross bore 58 in communication with the atmospheric slot 64 in the cut off plunger, the connection with the manifold 22 being automatically eliminated. The clutch pedal 16 may now be operated in the usual fashion by the foot of the operator.

There is thus provided a very compact and effective valve unit housing the three necessary controls of the clutch operating fluid motor.

While one illustrative embodiment has been described, it is not our intention to limit the scope of the invention to that particular embodiment, or otherwise than by the terms of the appended claims.

We claim:

1. Clutch control mechanism for an automotive vehicle comprising a valve unit for controlling the operation of a clutch operating motor, said unit including a casing member, a plurality of valve members mounted within said casing for reciprocable movement therein, two of said latter members being jointly operable to control the influx and efflux of power fluid to and from said motor and a third reciprocable valve member being operable to selectively cut-in and cut-out the operation of the motor.

2. Clutch control mechanism for an automotive vehicle comprising a valve unit for controlling the operation of a clutch operating motor, said unit including an angular-shaped casing member, a plurality of valve members mounted within said casing for reciprocable movement therein, two of said latter members being mounted in juxtaposition one beside the other and operable to control the influx and efflux of power fluid to and from said motor and a third reciprocable valve member being operable to selectively cut-in and cut-out the operation of the motor.

3. Clutch control mechanism for an automotive vehicle comprising a valve unit for controlling the operation of a clutch operating motor, said unit including a casing member, a plurality of valve members mounted within said casing for reciprocable movement therein, two of said latter members being jointly operable to control the influx and efflux of power fluid to and from said motor and a third reciprocable valve member being operable to selectively cut-in and cut-out the operation of the motor, a single manually operable means for effecting the joint operation of the first mentioned reciprocable valve members and other independently operated manually operable means for operating the last mentioned valve member.

4. In a power operated clutch control mechanism of the class described, a control valve unit therefor comprising a one-piece casing member and three mutually cooperating reciprocable piston valve members housed within said casing, said cooperation effecting a control of the operation of the power mechanism, two of said latter members being connected together for joint operation and the third being independently operable.

5. In a power operated clutch control mechanism of the class described, a control valve unit therefor comprising a one-piece casing member and three reciprocable piston valve members housed within said casing in parallel formation, said members cooperating to control the operation of the power mechanism, two of said latter members being connected together in tandem for joint operation and the third being independently operable.

VICTOR W. KLIESRATH.
HAROLD W. PRICE.